US010905133B2

(12) United States Patent
Edara et al.

(10) Patent No.: US 10,905,133 B2
(45) Date of Patent: Feb. 2, 2021

(54) FOOD WITH IMPROVED AROMA AND TASTE

(71) Applicant: Conopco, Inc., Englewood Cliffs, NJ (US)

(72) Inventors: Varun Edara, Rotterdam (NL); Sara Isabel Da Fonseca Selgas Martins Van Der Maaten, Rotterdam (NL); Veronica Galindo-Cuspinera, Rotterdam (NL); Ann-Marie Williamson, Sandy (GB)

(73) Assignee: Conopco, Inc., Englewood Cliffs, NJ (US)

( * ) Notice: Subject to any disclaimer, the term of this patent is extended or adjusted under 35 U.S.C. 154(b) by 127 days.

(21) Appl. No.: 15/100,902

(22) PCT Filed: Nov. 14, 2014

(86) PCT No.: PCT/EP2014/074682
§ 371 (c)(1),
(2) Date: Jun. 1, 2016

(87) PCT Pub. No.: WO2015/086262
PCT Pub. Date: Jun. 18, 2015

(65) Prior Publication Data
US 2016/0295880 A1  Oct. 13, 2016

(30) Foreign Application Priority Data
Dec. 9, 2013 (EP) ..................... 13196169

(51) Int. Cl.
*A23G 9/04* (2006.01)
*A23G 9/42* (2006.01)
*A23G 9/36* (2006.01)

(52) U.S. Cl.
CPC .............. *A23G 9/04* (2013.01); *A23G 9/045* (2013.01); *A23G 9/36* (2013.01); *A23G 9/42* (2013.01); *A23V 2002/00* (2013.01)

(58) Field of Classification Search
CPC ...................................... A23G 9/04
See application file for complete search history.

(56) References Cited

U.S. PATENT DOCUMENTS

| | | | |
|---|---|---|---|
| 5,246,725 A | 9/1993 | Fisher et al. | |
| 2004/0018277 A1 | 1/2004 | Zugmeyer et al. | |
| 2005/0142253 A1 | 6/2005 | Purcell | |
| 2006/0280835 A1 | 12/2006 | Jani et al. | |
| 2006/0280836 A1 | 12/2006 | Jani et al. | |
| 2006/0280837 A1 | 12/2006 | Jani et al. | |
| 2007/0231430 A1 | 10/2007 | Brown et al. | |
| 2009/0123502 A1 | 5/2009 | Kumiega et al. | |
| 2011/0045156 A1 | 2/2011 | Stieger et al. | |
| 2011/0217425 A1 | 9/2011 | Puaud et al. | |
| 2012/0093978 A1 | 4/2012 | Dijksterhuis et al. | |
| 2013/0295224 A1* | 11/2013 | Dijksterhuis | A23G 1/32 426/2 |

FOREIGN PATENT DOCUMENTS

| | | |
|---|---|---|
| EP | 1040765 | 10/2000 |
| EP | 1110460 | 6/2001 |
| EP | 1120044 | 8/2001 |
| EP | WO10098659 | 9/2010 |
| WO | WO03020869 | 3/2003 |
| WO | WO03049548 | 6/2003 |
| WO | WO03049553 | 6/2003 |
| WO | WO2009061871 | 5/2009 |
| WO | WO2011003705 | 1/2011 |
| WO | WO2011003707 | 1/2011 |
| WO | WO2012033399 | 3/2012 |
| WO | WO2012089461 | 7/2012 |

OTHER PUBLICATIONS

Batenburg et al., Saltiness Enhancement by Savory Aroma Compounds, Journal of Food Science, 2011, pp. S280-S288, vol. 76 No. 5.
Berre et al, Reducing bitter taste through perceptual constancy created by an expection, Food Quality and Preference, Oct. 10, 2012, 370-374, 28, NL.
Burseg et al, Sweet taste intensity is enhanced by temporal fluctuation of aroma and taste, and depends on phase shift, Physiology & Behavior, Aug. 14, 2010, 726-730, 101, NL.
Burseg et al., Sweet taste enhancement through pulsatile stimulation depends on pulsation period not on conscious pulse perception, Physiology & Behavior, 2010, pp. 327-331, 100.
Busch, Temporal Contrast of Salt Delivery in Mouth Increases Salt Perception, Chemical Senses, Mar. 9, 2009, 341-2009, 34, NL.
Castro-Prada et al., An Improved Instrumental Characterization of Mechanical and Acoustic Properties of Crispy Cellular Solid Food, Journal of Texture Studies, Dec. 2007, pp. 698-724, vol. 38 Issue 6.
Cayeux, I.; Mercier, C., Sensory evaluation of interaction between smell and taste—application to sourness, Flavour Research at the Dawn of the Twenty-first Century—Proceedings of the 10th Weurman Flavour Research Symposium, 2003, Full title of book: Flavour Research at the Dawn of the Twenty-first Century—Proceedings of the 10th Weurman Flavour Research Symposiumpp. 287-292.

(Continued)

*Primary Examiner* — Jenna A Watts
(74) *Attorney, Agent, or Firm* — Gerard J. McGowan, Jr.

(57) ABSTRACT

Food and beverages manufacturers are actively looking for ways or alternatives to enhance flavour in their products. That could be by using ingredients that provide aroma, taste and mouth feel with low calorie content and no after taste, or technology that allows consumers an enhanced experience without adding extra ingredients. Solutions could be highly specific. This invention relates to a food product or part thereof comprising a sour tastant and at least one flavour congruent with the sour tastant, wherein the at least one flavour is distributed homogeneously throughout the food product or part thereof, and wherein the sour tastant is distributed throughout the food product or part thereof inhomogeneously, and wherein the food product or part thereof can be consumed whole by a consumer, and wherein the food product or part thereof is in the form of a frozen confection. The food product or part thereof was observed to impart an enhanced perception of lemon flavour and sour taste.

12 Claims, No Drawings

(56) References Cited

OTHER PUBLICATIONS

Dongowski et al., Binding of Water, Oil, and Bile Acids to Dietary Fibers of the Cellan Type, Biotechnology Progress, 1999, pp. 250-258, vol. 15, Issue 2.
Fujimaru et al, Effects of Stimulus Intensity on Odor Enhancement by Taste, Chemical Perception, Jan. 29, 2013, 1-7, 6, US.
Gerard Van Dalen, A Study of Bubbles in Foods by X-Ray Microtomography and Image Analysis, Microscopy and Analysis, 2012, pp. S8-S12.
Green et al, Enhancement of Retronasal Odors by Taste, Chemical Senses, 2012, 77-86, 37, US.
Hewson et al, Taste-aroma interactions in a citrus flavoured model beverage system: Similarities and differences between acid and sugar type, Food Quality and Preference, Nov. 19, 2007, pp. 323-334, vol. 19, GB.
Hort et al, Controlled Continuous Flow Delivery System for Investigating Taste-Aroma Interactions, Journal of Agricultural and Food Chemistry, Jun. 22, 2004, 4834-4843, 52, GB.
IPRP2 in PCTEP2014074682, Feb. 26, 2016.
Kerstin Burseg, Emerging technology tackles taste, Prepared Foods, Jul. 2011, pp. 61-66, 180 7.
Lee et al, Effect of Blanching Treatments on the Firmness of Carrots, Journal of Food Science, 1979, pp. 615-616, vol. 44 Issue 2.
Mebatsion et al., A novel method for 3-D microstructure modeling of pome fruit tissue using synchrotron radiation tomography images, Journal of Food Engineering, 2009, pp. 141-148, vol. 93 Issue 2.
Meiselman et al., Enhancement of Taste Intensity Through Pulsatile Stimulation, Physiology and Behavior, 1973, pp. 713-716, vol. 11.
Mosca et al, Designing Food Structure to Enhance Taste Intensity, Wageningen, ., 1-5, ., NL.
Mosca et al, Enhancement of sweetness intensity in gels by inhomogeneous distribution of sucrose, Food Quality and Preference, Apr. 20, 2010, 837-842, vol. 21 No. 7.
Mosca et al., Effect of gel texture and sucrose spatial distribution on sweetness perception, LWT—Food Science and Technology, 2012, pp. 183-188, vol. 46 Issue 1.
Nakao et al, Inhomogeneous spatial distrubution of aroma compounds in food gels for enhancement of perceived aroma intensity and muscle activity during oral processing, Journal of Texture Studies, 2013, 289-300, 44, JP.
Noort et al, Saltiness enhancement by taste contrast in bread prepared with encapsulated salt, Journal of Cereal Science, Nov. 12, 2011, 218-225, 55, NL.
Noort et al, Saltiness enhancement in bread by inhomogeneous spatial distribution of sodium chloride, Journal of Ceral Science, Jun. 18, 2010, 1-9, ., NL.
Noort et al., Saltiness enhancement in bread by inhomogeneous spatial distribution of sodium chloride, Journal of Cereal Science, 2010, pp. 378-386, 52.
Pfeiffer et al, Taste-aroma interactions in a ternary system: A model of fruitiness perception in sucrose/acid solutions, Perception & Psychophsics, 2006, 216-227, 68, GB.
Search Report and Written Opinion in EP131961690, dated May 19, 2014.
Search Report in PCTEP2014074682, dated Jan. 23, 2015.
Seo et al, A Salty-Congruent Odor Enhances Saltiness: Funcitonal Magnetic Resonance Imaging Study, Human Brain Mapping, Oct. 22, 2011, 62-76, 34, DE.
Written Opinion in PCTEP2014074682, dated Jan. 23, 2015.
Written Opinion1 in PCTEP2014074682, dated Oct. 19, 2015.
Ice Lollies, Mintel, 2011, pp. 1-3, Record ID: 1527335.
Twister Ice Lollies, Mintel, 2012, pp. 1-4 (Record ID: 1835417).

\* cited by examiner

FOOD WITH IMPROVED AROMA AND TASTE

This invention relates to a food product or part thereof comprising a sour tastant and at least one flavour congruent with the sour tastant, wherein the at least one flavour is distributed homogeneously throughout the food product or part thereof, and wherein the sour tastant is distributed throughout the food product or part thereof inhomogeneously, and wherein the food product or part thereof can be consumed whole by a consumer. The food product or part thereof was observed to impart an enhanced perception of lemon flavour and sour taste.

Food and beverages manufacturers are actively looking for ways or alternatives to enhance flavour in their products. That could be by using ingredients that provide aroma, taste and mouth feel with low calorie content and no after taste, or technology that allows consumers an enhanced experience without adding extra ingredients. Solutions could be highly specific. The present invention relates to one solution where the pattern of delivery of taste stimuli is manipulated to enhance flavour perception.

Previous studies have focused on the pattern of delivery of taste stimuli focusing on enhancing taste perception. A continuous and prolonged exposure to taste stimuli leads to adaptation and results in a gradual decrease of taste receptors response. Meiselman et al (Physiology and Behaviour, 11, 713-716 (1973)) reported that human magnitude estimates of a 500 mM NaCl solution increased with time when alternating pulses of NaCl and H2O (2 sec-2 sec to 1 sec-1 sec) were delivered to the tongue, but decreased with a continuous NaCl flow. Normal human drinking, and intermittent liquid intake in other species, may be similar enhancement situations.

Busch et al. (Chem. Senses, 34, 341-348 (2009)) describes a study on the impact of salt delivery in mouth on salt perception. Saltiness ratings were scored by a panel over time during various stimulation conditions involving relative changes in NaCl concentration of 20% and 38%. The results suggested that the frequency, timing, and concentration differences of salt stimuli affected saltiness. Specifically, a short and intense stimulus increased salt perception, possibly through a reduction of adaptation. Both these studies were performed in liquids.

Mosca et al (LWT—Food Science and Technology, 46, 183-188 (2012)) describes a study on the effects of textural properties and spatial distribution of sucrose on the enhancement of sweetness intensity in gels. Gels, prepared from agar and gelatine, differing in mechanical and breakdown properties (soft, medium and hard gels) were prepared by varying the concentration of gelling agents. Soft gels showed low values of fracture strain and fracture stress and broke down in a large number of small fragments upon chewing. Hard gels showed high fracture values and broke down in a small number of large fragments. Gels with a homogeneous distribution of sucrose were prepared by combining four layers containing 10% w/w sucrose and gels with an inhomogeneous distribution were prepared by combining layers with 0 and 40% w/w sucrose. The overall sucrose concentration was 10% w/w in all layered gels. The sweetness of layered gels with an inhomogeneous distribution of sucrose was compared to the sweetness of gels with a homogenous distribution. All gels with an inhomogeneous distribution of sucrose were perceived sweeter than gels with a homogeneous distribution. Furthermore, soft/brittle gels were perceived sweeter than medium and hard gels. Thus the breakdown behaviour of the gel matrix during oral processing affects the perception of taste. The formation of a large number of gel fragments during chewing results in a large surface of contact between tastants and taste receptors and led to a higher perceived taste intensity.

Burseg et al. (Physiology & Behaviour, 101, 726-730 (2010)) describes a study on enhancing taste intensity from the combined contribution of aroma (banana delivered by isoamyl acetate) and taste (sucrose) by pulsatile stimulation compared to continuous stimulation with stimuli of the same net concentration of aroma and tastant. High-concentration sucrose pulses were alternated with water rinses every 2.5 s. Four different aroma (isoamyl acetate) versions were presented: (1) no aroma, (2) continuous aroma (3) aroma pulses in-phase and (4) aroma pulses out-of-phase with taste pulses. It was observed that sweetness intensity was enhanced by pulsatile stimulation of sucrose or isoamyl acetate. In addition, taste enhancement by aroma and tastant pulses was additive if both were presented out-of-phase which resulted in a sweetness intensity enhancement by more than 35% compared to a continuous sucrose reference of the same net sucrose concentration.

Mosca et al. (Food Quality and Preference, 21, 837-842 (2010)) describes a study on perceived sweetness intensity of the effect of the spatial distribution of sucrose in model systems consisting of layers of mixed agar/gelatine gel. All samples had the same overall sucrose concentration (10%) and similar mechanical and rheological properties. It was observed that inhomogeneous samples that had large concentration gradients of sucrose between layers were sweeter than the homogeneous reference. No differences in sweetness were observed between the reference and samples with small concentration gradients of sucrose. Additionally, the position of the layers containing sucrose did not affect sweetness. The results showed that an inhomogeneous distribution of sucrose can be used to reduce sucrose content by 20% without a decrease in sweetness intensity.

Noort et al (J. of Cereal Sci., 55, 218-225 (2012)) describes a study on reducing sodium content of bread whilst retaining its sensory profile by creating taste contrast using encapsulated salt. The salt was encapsulated in high melting fat and had particle sizes of 250-1000 microns for 89% of the material. Other encapsulated salt particles were prepared from particle fractions of 900-1180 and 1680-2000 microns, also encapsulated in a fat. Small encapsulates led to small concentration gradients of salt which did not affect the saltiness intensity and consumer liking. Large encapsulates led to large concentration gradients which enhanced saltiness intensity significantly and reduced consumer liking. Salt reduction of up to 50% was achieved whilst maintaining saltiness intensity.

Noort et al. (J. Cereal Sci., 1-9 (2010)) describes a study on enhancing saltiness intensity in bread using an inhomogeneous spatial distribution of sodium thereby significantly reduce the sodium content in bread without loss of saltiness intensity and without the use of sodium substitutes, taste or aroma additives. Bread was prepared from horizontally laminated bread dough in which (i) the layers contained all the same salt content (homogeneous distribution) or (ii) which had alternating layers of high and low salt content (heterogeneous distribution). It was observed that an inhomogeneous distribution of salt in bread can be used to enhance saltiness intensity allowing for reduction of salt without loss of saltiness intensity. The relative enhancement of the saltiness was largest at the lowest total salt content (1.0% corresponding to a 50% reduction of salt concentration relative to reference bread). The saltiness intensity was enhanced by 117% by heterogeneity. The magnitude of the saltiness enhancement increases with increasing sensory contrast such that at 1.5% salt content, an enhancement of saltiness by 5% was found with a concentration contrast of 1:2.2; 15% with 1:3.1; 52% with 1:12; and 76% with 1:115. A 28% salt reduction in bread was obtained without loss of saltiness intensity and without use of sodium substitutes, taste or aroma additives.

Pfeiffer et al. (Perception & Psychophysics, 68, 2, 216-227 (2006)) describes a study on cross-modal interactions between aroma, sweetness (sucrose), and acidity. A series of samples was presented to trained panellists who assessed strawberry flavour intensity using magnitude estimation with a reference modulus. Two groups of panellists were identified. For Group 1, increasing sucrose and/or acid levels also increased the perceived flavour intensity. For Group 2, changing sucrose concentrations had little effect, but increasing acid and/or volatile levels did. The results showed different effects of organic and inorganic acids on perception, as well as clear interactions between the modalities of taste (sugar and acid) and aroma.

Hort et al. (J. Agric. Food Chem., 52, 4834-4843 (2004)) describes a study on taste-aroma interactions. Controlled amounts of isoamyl acetate (100 ppm), simulating a banana aroma, and sucrose (0-3%) solution was administered to experienced and naive assessors who used time intensity techniques to record perceived 'fruit' flavour intensity. The results indicated that sucrose is a key driver of fruit flavour intensity but that the magnitude of the effect varies between individuals.

Green et al. (Chem. Senses, 37, 77-86 (2012)) describes a study on enhancement of retronasal odours by taste. In a first experiment, subjects rated taste ("sweet," "sour," "salty," and "bitter") and odour ("other") intensity for aqueous samples of three tastants (sucrose, NaCl, and citric acid) and three odorants (vanillin, citral, and furaneol), both alone and in tasteodor mixtures. The results showed that sucrose, but not the other taste stimuli, significantly increased the perceived intensity of all three odours. Enhancement of tastes by odours was inconsistent and generally weaker than enhancement of odours by sucrose. A second experiment used a flavoured beverage and a custard dessert to test whether the findings from the first experiment would hold for the perception of actual foods. Adding sucrose significantly enhanced the intensity of "cherry" and "vanilla" flavours, whereas adding vanillin did not significantly enhance the intensity of sweetness.

Unilever's Wall's Twister ice cream lollipop consists of a pineapple ice cream and lemon-lime flavoured fruit ice arranged in a double spiral on the outside of a cylindrically shaped core consisting of a strawberry flavoured water ice. The level of citric acid in each part of the lollipop is adjusted to suit the particular flavour.

US 2007/0231430 A1 (Brown at al.) discloses an extinguisher food product in which the intensity level of each piece of food product is controlled. The intensity level of each piece may be a sourness level or a spiciness level. The extinguisher food product may be a hard candy, fruit snack or other snack products. In one embodiment, the snack is a continuous strip of food product (that may be, for example, rolled up when sold to a user) wherein different portions of the strip each have a different intensity level (when that portion of the strip is consumed by the user) and the strip also has an extinguisher portion, which counteracts or reduces the effects of the other portions. The claimed invention is exemplified by a food product wherein each portion of the food product is a separate piece, rather than part of a unitary food product.

WO 2012/089461 A1 (Unilever Plc et al.) describes a food product which has a decreased amount of aroma compounds, without compromising on the taste, flavour, feeling, mouth feel, sensory properties, and liking of these products as compared to similar products which do not have the decreased level of aroma compound. This is achieved by distributing the aroma compounds across at least two sections in different concentrations, wherein the at least two sections have the same visual appearance and the same other sensory properties (e.g. colour, structure, texture, or any other obviously and directly perceivable property), such that the at least two sections of the food product appear to be having the same composition and that the food product is a homogeneous composition. These at least two sections are consumed in different bites or different sips. Due to the homogeneous appearance of the food product, the consumer expects a constant tasting food product, and the consumer does not detect the decrease of the aroma compound. During the consumption of the food product, for example when having consumed the first section, and starting with the second section, the consumer still perceives the food product to be homogeneous, as the visual appearance and other sensory properties of the second section is the same as that of the first section.

Le Berre et al. (Food Quality and Preference, 28, 370-374 (2013)) describes a study on the influence of a perceptual expectation, based on the first bite of a model product, on the perception of the taste of subsequent bites for bitter taste. Using a chocolate ice cream model product consisting of three regions of differing concentrations of a bitter compound (theobromine), it was observed that when the first bite is of a low bitter intensity, the perception of subsequent regions in the product assimilate towards a lower perceived bitterness intensity.

Nakao et al. (J. of Texture Studies, 44, 289-300 (2013)) describes a study on the effects of inhomogeneous spatial aroma distribution in food gels for the enhancement of perceived intensity. A polysaccharide mixture was used as the gel matrix, in which small cubes from the same gelling agent were dispersed at 50% weight ratio. The distribution of sucrose in the food gels was homogeneous. Degree of inhomogeneous spatial aroma distribution was arranged by its concentration in both the matrix and the dispersed gels although the overall aroma concentration within one gel sample was constant. There were no differences in mechanical properties between structured gel samples. A greater degree of inhomogeneous spatial aroma distribution increased perceived intensity.

WO 2011/003707 (Unilever et al.) describes a food product with a decreased concentration of salt, which can be considered to be unhealthy when consumed in large amounts, from having negative taste attributes. The concentration of 'unhealthy' ingredients, like salt, in food products can be reduced while the consumer does not observe the decrease of the 'unhealthy' ingredients. The consumer perceives the food product of which the 'unhealthy' ingredient has been reduced to be homogeneous with regard to taste and of the same quality as food products with a normal concentration of the tastant. This is achieved by distributing the tastant across at least two sections in different concentrations, wherein the at least two sections have the same visual appearance. These at least two sections are consumed in different bites or different sips. Due to the homogeneous appearance of the food product, the consumer expects a constant tasting food product, and the consumer does not detect the decrease of the 'unhealthy' ingredient. In case a reduction of a tastant is desired (e.g. salt), the first section (which is taken in first when consuming the food product) contains a normal concentration of the tastant, while the second section (which is consumed directly after finishing the first section) contains a lower concentration of the tastant.

WO 2010/098659 (Stichtung Top Institute Food and Nutrition and CSM Nederland BV) disclose that an inhomogeneous tastant bulk distribution in a food product can be used for enhancing and/or improving the sensory perception of the tastant in a food product. It has further been found that an inhomogeneous tastant bulk distribution in a food product can be used for providing a food product with a reduced tastant bulk weight percentage. Thus a flour-based bakery product is provided containing NaCl in an amount of 0.1-2.0% by weight, and comprising at least two flour-based bulk regions with: 20-80% by weight of the bakery product of a first flour-based bulk region, wherein the first flour-based bulk region comprises NaCl in an amount of 0.15-2.8% by weight of said first bulk region; and 20-80% by weight of the bakery product of a second flour-based bulk region not containing NaCl or containing NaCl in a weight percentage that is 50% or less of the weight percentage of NaCl in the first flour-based bulk region; wherein the first flour-based bulk region and the second flour-based bulk region together represent at least 60 weight % of the flour-based bakery product.

SUMMARY OF THE INVENTION

The inventors have observed that in a water ice, the tastant citric acid and the aroma lemon flavour are congruent and to increase the perception of both, only one parameter (lemon flavour or citric acid) needs to be increased. Furthermore the inventors have observed that the localization of different levels of citric acid within the layers of a water ice while keeping the overall concentration constant resulted in an enhanced perception of lemon flavour and sour taste. In contrast the localization of different levels of lemon flavour within the layers of a water ice while keeping the overall concentration constant resulted in no significant effect on the lemon flavour and sour taste perception.

Thus in a first aspect of the invention, a food product or part thereof is provided, the food product or part thereof comprising:
(a) 0.002 to 5, preferably 0.02 to 2, more preferably 0.05 to 1% w/w a sour tastant;
(b) 0.001 to 2.5, preferably 0.01 to 1.25, more preferably 0.01 to 0.5% w/w at least one flavour congruent with the sour tastant;

wherein the at least one flavour is distributed homogeneously throughout the food product or part thereof;

wherein the sour tastant is distributed throughout the food product or part thereof inhomogeneously;

wherein the food product or part thereof can be consumed whole by a consumer; and wherein the food product or part thereof is in the form of a frozen confection.

By the term "sour tastant" is meant any food ingredient with a sour taste.

By the term "congruent" is meant there is cross-modal cognitive association.

DETAILED DESCRIPTION OF THE INVENTION

In a first aspect of the invention, a food product or part thereof is provided, the food product or part thereof comprising:

(a) 0.002 to 5, preferably 0.02 to 2, more preferably 0.05 to 1% w/w a sour tastant;
(b) 0.001 to 2.5, preferably 0.01 to 1.25, more preferably 0.01 to 0.5% w/w at least one flavour congruent with the sour tastant;

wherein the at least one flavour is distributed homogeneously throughout the food product or part thereof;

wherein the sour tastant is distributed throughout the food product or part thereof inhomogeneously;

wherein the food product or part thereof can be consumed whole by a consumer; and wherein the food product or part thereof is in the form of a frozen confection.

The term "frozen confection" means a sweet-tasting fabricated foodstuff intended for consumption in the frozen state (i.e. under conditions wherein the temperature of the foodstuff is less than 0° C., and preferably under conditions wherein the foodstuff comprises significant amounts of ice). Frozen confections include ice cream, sorbet, sherbet, frozen yoghurt, water ice, and the like. Preferably the frozen confection has a total solids content (i.e. the sum of the weights of all the ingredients other than water, expressed as a percentage of the total weight) of at least 20%, more preferably at least 25%. Frozen confections may be aerated or unaerated. Preferably the frozen confection is aerated, i.e. it has an overrun of more than 20%, preferably more than 30%, more preferably more than 50%. Preferably the frozen confection has an overrun of less than 200%, more preferably less than 150%, most preferably less than 100%. Overrun is defined by the equation below and is measured at atmospheric pressure:

$$\text{overrun \%} = \frac{\text{density of mix} - \text{density of frozen confection}}{\text{density of frozen confection}} \times 100$$

The frozen confection may be manufactured by any suitable process, typically by preparing a mix of ingredients; then pasteurising and optionally homogenising the mix; and then freezing and optionally aerating the mix to produce the frozen confection.

The sour tastant can be a food-grade acid, preferably wherein the food-grade acid is selected from the group consisting of acetic acid, citric acid, tartaric acid, fumaric acid, malic acid, salts thereof, esters thereof, or mixtures thereof, most preferably the food-grade acid is citric acid.

The tastant can be a food-grade acid, the flavour is a citrus flavour, preferably wherein the citrus flavour is selected from the group consisting of lemon, lime, grapefruit, tangerine, orange, and mixtures thereof.

Preferably the difference in tastant concentration between a first part of the food product or part thereof with the highest concentration of sour tastant and a second part of the food product or part thereof with the lowest concentration of sour tastant is at least 20, preferably at least 40, most preferably at least 60% of the w/w concentration of the sour tastant when homogeneously distributed in the food product or part thereof. Preferably the difference is at most 160% of the w/w concentration of the sour tastant when homogeneously distributed in the food product or part thereof.

In one embodiment, the first or second parts of the food product or part thereof exclude sour tastant.

Preferably the food product is in the form of a frozen confection selected from the group consisting of a water ice, a granita, an ice cream, a sorbet, a sherbet and a frozen beverage such as a slush.

In yet another embodiment, the food product or part thereof is visually homogeneous. In another embodiment, the food product or part thereof is textually homogeneous.

Example 1: Preparation and Evaluation of Lemon Flavoured Water Ices

Materials
Lemon flavour supplied by Symrise MRDR code 376139.
Methods
Preparation of Water Ices
The solutions set forth in Tables 1 to 4 were prepared and cooled to 4 degrees centigrade.

TABLE 1

Citric acid solutions (% change of citric acid from H17)

| Ingredients (% w/w) | C1 | C2 | C3 | C4 |
|---|---|---|---|---|
| Sucrose | 16.5 | 16.5 | 16.5 | 16.5 |
| Glucose | 5.5 | 5.5 | 5.5 | 5.5 |
| Locust bean gum | 0.2 | 0.2 | 0.2 | 0.2 |
| Citric acid | 0.24 | 0.16 | 0.28 | 0.12 |
| Lemon flavour | 0.1 | 0.1 | 0.1 | 0.1 |
| Water | qs | qs | qs | qs |
| % change | +20% | −20% | +40% | −40% |

TABLE 2

Lemon flavor solutions (% change of lemon flavour from H17)

| Ingredients (% w/w) | F5 | F6 | F7 | F8 |
|---|---|---|---|---|
| Sucrose | 16.5 | 16.5 | 16.5 | 16.5 |
| Glucose | 5.5 | 5.5 | 5.5 | 5.5 |
| Locust bean gum | 0.2 | 0.2 | 0.2 | 0.2 |
| Citric acid | 0.2 | 0.2 | 0.2 | 0.2 |
| Lemon flavour | 0.12 | 0.08 | 0.16 | 0.04 |
| Water | qs | qs | qs | qs |
| % change | +20% | −20% | +60% | −60% |

TABLE 3

Control solutions (% change from H17)

| Ingredients (% w/w) | H15 | H17 |
|---|---|---|
| Sucrose | 16.5 | 16.5 |
| Glucose | 5.5 | 5.5 |
| Locust bean gum | 0.2 | 0.2 |
| Citric acid | 0.24 | 0.2 |
| Lemon flavour | 0.12 | 0.1 |
| Water | qs | qs |
| % change | +20% citric acid +20% lemon flavour | Standard |

TABLE 4

Solutions with changes of combinations of citric acid and lemon flavor (% change from H17)

| Ingredients (% w/w) | M1 | M2 | M5 | M6 |
|---|---|---|---|---|
| Sucrose | 16.5 | 16.5 | 16.5 | 16.5 |
| Glucose | 5.5 | 5.5 | 5.5 | 5.5 |
| Locust bean gum | 0.2 | 0.2 | 0.2 | 0.2 |
| Citric acid | 0.28 | 0.12 | 0.28 | 0.12 |
| Lemon flavour | 0.12 | 0.08 | 0.08 | 0.12 |
| Water | qs | qs | qs | qs |
| % change | +40% citric acid +20% lemon flavour | −40% citric acid −20% lemon flavour | +40% citric acid −20% lemon flavour | −40% citric acid +20% lemon flavour |

The water ices were prepared from the solutions set forth in Tables 1 to 4 in a layered fashion in accordance with Table 5. The layer thickness of 4 millimeters was defined such that diffusion would not affect the inhomogeneity of the water ices at the time of sensory evaluation. Each solution was pipetted into a mould and cooled to −30 degrees centigrade before being transferred to a freezer at −18 degrees centigrade and hardened overnight. Then the procedure was repeated for the next layer.

TABLE 5

Water ice layers (each 4 millimeters thick) using the solution nomenclature from Tables 1 to 4 (samples 12, 14, 15 and 17 are control samples)

| | Layer | | | |
|---|---|---|---|---|
| | 1 | 2 | 3 | 4 |
| Sample 1 | C1 +20% citric acid | C2 −20% citric acid | C1 +20% citric acid | C2 −20% citric acid |
| Sample 2 | C3 +40% citric acid | C4 −40% citric acid | C3 +40% citric acid | C4 −40% citric acid |
| Sample 5 | F5 +20% lemon flavour | F6 −20% lemon flavour | F5 +20% lemon flavour | F6 −20% lemon flavour |
| Sample 6 | F7 +60% lemon flavour | F8 −60% lemon flavour | F7 +60% lemon flavour | F8 −60% lemon flavour |
| Sample 12 | C1 +20% citric acid | C1 +20% citric acid | C1 +20% citric acid | C +20% citric acid |
| Sample 14 | F5 +20% lemon flavour | F5 +20% lemon flavour | F5 +20% lemon flavour | F5 +20% lemon flavour |
| Sample 15 | H15 +20% citric acid +20% lemon flavour | H15 +20% citric acid +20% lemon flavour | H15 +20% citric acid +20% lemon flavour | H15 +20% citric acid +20% lemon flavour |

TABLE 5-continued

Water ice layers (each 4 millimeters thick) using the solution nomenclature from Tables 1 to 4 (samples 12, 14, 15 and 17 are control samples)

| | Layer | | | |
|---|---|---|---|---|
| | 1 | 2 | 3 | 4 |
| Sample 17 | H17 Standard | H17 Standard | H17 Standard | H17 Standard |
| Sample 7 | M1 +40% citric acid +20% lemon flavour | M2 −40% citric acid −20% lemon flavour | M1 +40% citric acid +20% lemon flavour | M2 −40% citric acid −20% lemon flavour |
| Sample 9 | M5 +40% citric acid −20% lemon flavour | M6 −40% citric acid +20% lemon flavour | M5 +40% citric acid −20% lemon flavour | M6 −40% citric acid +20% lemon flavour |

Sensory Evaluation

A maximum of 13 samples were tested per session, the samples being randomized within a single session. A trained panel, consisting of 14 people, evaluated the water ices in accordance with the following tasting method:

Each panellist was presented with two examples of each water ice. The serving temperature was −18 degrees centigrade. Panellists evaluated one sample at a time in a sequential monadic way. Samples were presented under white light. Samples were randomized and presented twice during the experiment. The panellists took bites from the ice cubes through the four layers (from up to down) so they get the same amount from each layer in their mouth. Panellists were offered tap water and cream cracker as palate cleansers between evaluations.

During the training sessions the panellists generated the attribute list best describing the products that they were presented with. By exposing the panellists during the training to a set of samples with different compositions (including extremes) the panellists became familiar with the entire range of sensory characteristics exhibited by the samples and the intensity range. This helped the panellists to use the entire scale range and to better discriminate between the samples. The panellists were asked to describe each of the samples in terms of the following sensory characteristics:

Basic tastes
Flavour
Mouth feel
After taste and/or after feel

The term flavour indicates the overall combination of olfactive and gustative sensations during consumption. This list of attributes was discussed by the panel. The panellists came to a consensus of opinion and chose a single word to describe the particular sensory character.

For this example six attributes were generated and agreed by the panellists to best describe the differences between the samples. The attribute list generated and how they were evaluated in the water ice examples is set forth in Table 6.

TABLE 6

Attribute list.

| Attribute | Dummy | Description | How |
|---|---|---|---|
| 1) Hardness mouthfeel | 8 | Resistance during biting in the water ice | Take a bite from the water ice |
| 2) Lemon flavour | 8 | Evaluated by tasting the flavoured product | Take a bite from the water ice and chew on it |
| 3) Sweet taste | 10 | Degree of sweet taste (e.g. sucrose solution) | Take a bite from the water ice and chew on it |
| 4) Sour taste | 7 | Degree of sour taste (e.g. citric acid solution) | Take a bite from the water ice and chew on it |
| 5) Bitter after taste | 4 | Degree of bitter after taste (e.g. caffeine solution) | Taste after spit out or swallow |
| 6) Sweet after taste | 6 | Degree of sweet after taste (e.g. sucrose solution) | Taste after spit out or swallow |

The panel used a dummy sample. In the attribute list, for every attribute there's a score for the dummy. This is a reference sample for the panellists that they get at the beginning of every session to refresh their memory. The scores of this dummy were established by the panellists together during the training. The dummy used during this study was Sample 17 standard water ice with four identical layers.

The assessment for each attribute used a point scale 0-15. The panellists were trained using solutions of citric acid in water prepared at 0.016, 0.032, 0.048, 0.064 and 0.080% w/w which were then assigned a number on the scale of respectively 2, 5, 8, 11 and 14. This established an absolute intensity scale.

Results

The results are presented in Table 7 together with the ANOVA statistical analysis results.

TABLE 7

Results of sensory evaluation of water ices on scale
of 0-15 with ANOVA statistical analysis results

| Attribute (0-15) | Hardness mouth feel | Lemon flavour | Sweet taste | Sour taste | Bitter after taste | Sweet after taste |
|---|---|---|---|---|---|---|
| Sample 1 | 8.01 def | 7.45 ab | 10.06 abc | 6.98 abcd | 3.89 a | 5.51 b |
| Sample 2 | 7.83 def | 8.12 a | 10.02 abc | 7.07 abc | 3.90 a | 5.43 b |
| Sample 5 | 8.19 cdef | 8.05 ab | 9.91 be | 6.74 abcd | 4.01 a | 5.58 b |
| Sample 6 | 8.37 bcdef | 7.68 ab | 9.39 c | 6.59 abcd | 3.75 a | 5.02 b |
| Sample 12 | 8.22 bcdef | 8.08 a | 9.95 abc | 6.96 abc | 4.04 a | 5.65 ab |
| Sample 14 | 8.27 bcdef | 8.12 a | 9.88 c | 7.37 ab | 4.05 a | 5.28 b |
| Sample 15 | 8.72 bcde | 8.15 a | 9.23 c | 7.49 a | 3.95 a | 5.37 b |
| Sample 17 | 8.30 bcdef | 7.17 b | 9.70 c | 6.12 d | 4.04 a | 5.37 b |
| Sample 7 | 8.10 cdef | 7.51 ab | 9.72 c | 6.87 abcd | 4.03 a | 5.35 b |
| Sample 9 | 8.49 bcdef | 7.70 ab | 9.60 c | 6.95 abcd | 4.03 a | 5.30 b |

From the results, it is clear that the samples that were significantly different to the S17 control in regard to lemon flavour and/or sour taste perception were S2, S12, S14 and S15.

In particular, increasing the net levels of both lemon flavour and citric acid homogeneously by 20% each (Sample 15 with 0.24% w/w citric acid and 0.12% w/w lemon flavour) significantly increased the perception of both lemon flavour and sour taste attributes relative to the standard Sample 17. However surprisingly increasing only net citric acid level homogeneously by 20% (Sample 12 with 0.24% w/w citric acid and 0.10% w/w lemon flavour) led to not only a significant increase in perceived sour taste, but also to a significant increase in perceived lemon flavour relative to standard Sample 17 even though the net lemon flavour level was unchanged. The same effect was observed when only increasing the net lemon flavour level homogeneously by 20% (Sample 14 with 0.20% w/w citric acid and 0.12% w/w lemon flavour).

Delivering citric acid inhomogenously by using a contrast of 80% between layers (−40% w/w in one layer (0.12% w/w) and +40% w/w (0.28% w/w) in an adjacent layer) also led to a significant increase in the perceived lemon flavour as well as the perceived sour taste (Sample 2). This effect was observed by keeping the net concentration of the citric acid and lemon flavour constant, 0.2% and 0.1% w/w respectively, contrary to Sample 12 and Sample 14, where in both either citric acid or lemon flavour concentration was increased by 20% w/w. This effect started appearing with Sample 1 from 40% w/w concentration contrast (alternating layers with +20% and −20% w/w citric acid) but was not statistically significant.

Although it was observed that the perceived lemon flavour and perceived sour taste increased at a low contrast (Sample 5 with +/−20% w/w lemon flavour), the effect was not statistically significant. Increasing the contrast (Sample 6 with +/−60% w/w lemon flavour) did not lead to a further increase in the perceived lemon flavour and sour taste and in fact led to a slight decrease in their perception, but this difference was not statistically significant.

Conclusions

As it was observed that increasing only net citric acid level homogeneously by 20% (Sample 12 with 0.24% w/w citric acid and 0.10% w/w lemon flavour) led to not only a significant increase in perceived sour taste, but also to a significant increase in perceived lemon flavour relative to standard Sample 17 even though the net lemon flavour level was unchanged, and the same effect was observed when only increasing the net lemon flavour level homogeneously by 20%, it is clear that these two attributes (lemon flavour and sour taste) are congruent and to increase the perception of both, only one parameter (lemon flavour or citric acid) needs to be increased homogenously by at least 20% w/w.

The localization of different levels of citric acid within the layers of water ices while keeping the overall concentration constant resulted in an enhanced perception of lemon flavour and sour taste. This effect started appearing from 40% w/w concentration contrast (alternating layers with +20% and −20% w/w citric acid) and wa s statistically significant at 80% w/w concentration contrast (alternating layers with +40% and −40% w/w citric acid).

The localization of different levels of lemon flavour within the layers of water ices while keeping the overall concentration constant resulted in no significant effect on the lemon flavour and sour taste perception. Although the trend showed an increase, it failed to be significant.

Example 2: Frozen Beverage

Frozen beverage solutions can be prepared with 30% w/w sugar, 0.1% w/w xanthan, 0.1% citric acid and lemon flavour (0.01%). The solutions can be frozen to −7° C. in a GB 220 slush machine (Electrofreeze, U.K) to produce slush of ice crystal size 300 µm. 45% ice phase is expected for this formulation at −7° C.

Citric acid particles can be prepared by freezing sheets of acid solutions in a blast freezer. The particles are then size reduced using a Crushman 360 and then sieved to a size range of 2 to 4 mm. 30% w/w particles are added to the slush to create 20% and 30% citric acid contrast. AFP III HPLC-12 is an ice structuring protein (ISP) that can be found naturally in arctic fish such as eel pout, ocean pout and wolf fish. The protein has significant ice recrystallisation inhibition properties and can be expected to stabilise the ice fraction of the citric acid particles.

The final formulations of the frozen beverages are set forth in Tables 8a and 8b.

TABLE 8a

Frozen beverage formulation according to the invention with a 20% citric acid contrast

| Ingredient | % W/W |
|---|---|
| 70% w/w slush | 0.12% Citric acid (+20%) in solution |
| Sucrose | 30 |
| Xanthan | 0.1 |
| Citric aicd | 0.084 |
| Lemon flavour | 0.01 |
| Water | 49.79 |
| 30% Citric acid particles | 0.08% Citric acid (−20%) in particle |
| Citric acid | 0.016 |
| Lemon flavour | 0.004 |
| AFP III HPLC-12 | 0.005 |
| Water | 19.980 |
| Total | 100 |

TABLE 8b

Frozen beverage formulation according to the invention with a 30% citric acid contrast.

| Ingredient | % W/W |
|---|---|
| 70% w/w Slush | 0.13% Citric acid (+30%) in solution |
| Sucrose | 30 |
| Xanthan | 0.1 |
| Citric aicd | 0.091 |
| Lemon flavour | 0.01 |
| Water | 49.79 |
| 30% Citric acid particles | 0.03% Citric acid (−30%) in particle |
| Citric acid | 0.009 |
| Lemon flavour | 0.004 |
| AFP III HPLC-12 | 0.005 |
| Water | 19.987 |
| Total | 100 |

The invention claimed is:

1. A food product comprising:
(a) 0.002 to 5% w/w a sour tastant, wherein the sour tastant is a food-grade acid;
(b) 0.001 to 2.5% w/w at least one flavour congruent with the sour tastant, wherein the flavour is a citrus flavour;
wherein the at least one flavour is distributed homogeneously throughout the food product;
wherein the sour tastant is distributed throughout the food product inhomogeneously such that the difference in tastant concentration between a first part of the food product with the highest concentration of sour tastant and a second part of the food product with the lowest concentration of sour tastant is at least 40% of the w/w concentration of the sour tastant when homogeneously distributed in the food product;
wherein the food product can be consumed whole by a consumer; and wherein the food product is in the form of a frozen confection; wherein the sour tastant is a food-grade acid selected from the group of acetic acid, citric acid, tartaric acid, fumaric acid, malic acid, salts thereof, esters thereof, or mixtures thereof;
wherein the citrus flavour is selected from the group of lemon, lime, grapefruit, tangerine, orange, and mixtures thereof;
wherein the food product is in the form of a frozen confection selected from the group of a water ice, a granita, an ice cream, a sorbet, a sherbet and a frozen beverage.

2. The food product according to claim 1 wherein the difference is at most 160% of the w/w concentration of the sour tastant when homogeneously distributed in the food product.

3. The food product or part thereof according to claim 1 wherein the first or second parts of the food product exclude sour tastant.

4. The food product according to claim 1 which is visually homogeneous.

5. The food product according to claim 1 which is texturally homogeneous.

6. The food product according to claim 1 comprising 0.02 to 2% w/w a sour tastant.

7. The food product according to claim 1 comprising 0.05 to 1% w/w a sour tastant.

8. The food product according to claim 1 comprising 0.01 to 1.25% of at least one flavour congruent with the sour tastant.

9. The food product according to claim 8 comprising 0.01 to 0.5% w/w of at least one flavour congruent with the sour tastant.

10. The food product according to claim 1 wherein the food grade acid is citric acid.

11. The food product according to claim 1 wherein the lowest concentration of the sour tastant is at least 60% of the w/w concentration of the sour tastant when homogeneously distributed in the food product.

12. The food product according to claim 1 wherein the food product is in the form of a water ice.

* * * * *